Jan. 31, 1961 W. T. RUNGE ET AL 2,970,281
PULSE CODE MODULATION SYSTEM
Filed March 2, 1959
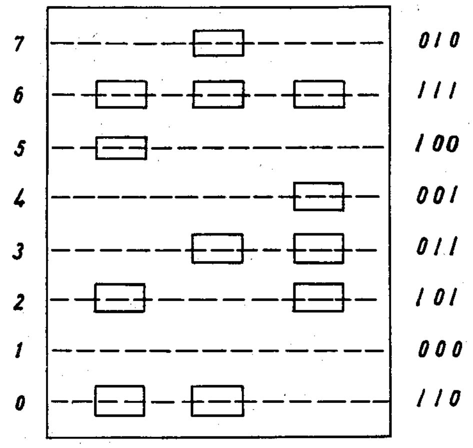
TARGET PLATE FOR A CATHODE RAY TUBE
Inventors:
Wilhelm T. Runge, Bela Betzenhammer and Ernst F. Henze
By [signature] Patent Agent 2,970,281
Patented Jan. 31, 1961

2,970,281

PULSE CODE MODULATION SYSTEM

Wilhelm T. Runge, Bela Betzenhammer, and Ernst F. Henze, Ulm (Danube), Germany, assignors to Telefunken G.m.b.H., Berlin, Germany Filed Mar. 2, 1959, Ser. No. 796,381

Claims priority, application Germany Mar. 7, 1958

2 Claims. (Cl. 332—13)

The present invention relates to a method and apparatus for pulse code modulating of signals.

It has been known to pulse code modulate a continuous wave function, such as a speech signal, into a series of binary numbers, each having $n$ digits.

If such a signal is divided into $2^n$ amplitude steps, then each of these amplitude steps may be represented by a binary number of $n$ digits. With the conventional binary system, each amplitude step corresponds exactly to the respective binary number. This will be clarified by the following example:

With a speech signal divided into eight steps, the three digit binary numbers 000, 001, 010 . . . 111 correspond exactly to the amplitude steps 0, 1, 2 . . . 7, such that the amplitude stage 5 corresponds exactly to the binary coded number 5, i.e., 101. With this conventional kind of system, the first digit of the binary number (the digit with the highest value, in the present example the value $2^2=4$) contains the major component of the information. From this digit, it may be ascertained whether the signal amplitude is above or below the midpoint. If the midpoint of the signal (in the present example the step 3) is assumed to be be the zero line, then the polarity of the signal may be determined from the first digit of the binary number. If the maximum information of a signal coded in the usual manner with an $n$ digit binary number is assigned the value of 1, then the first bit by itself conveys the information $I_1=2^{n-1}/2^n-1$, and this represents for all finite values of $n$ more than half of the conveyed information. A speech signal of known polarity transmitted alone is then almost intelligible.

It is an object of the present invention to provide a pulse code modulating system in which an $n$ digit binary number is assigned to each of the $2^n$ amplitude steps of a signal in order to distribute the information content of the signal as uniformly as possible among the individual digits of the binary number.

It is a further object of the invention to assign all binary numbers with an even number of zeros to one half, and all binary numbers with an odd number of zeros to the other half of the amplitude steps. To recognize the polarity of the signal in such assignment, it is necessary to know all of the digits of each individual binary number. Thus, it is not possible to decipher by only the first digit.

This method is of great advantage if, in addition to the binary code, a secret cipher is also used. Such enciphering operations are, for example, carried out by adding any series to binary numbers representing the message, because an unauthorized decoder, based on his experience with language coded in the conventional manner, would limit his endeavor for decoding to the first digit of each binary number to obtain an intelligible signal. However, with the enciphering system used in accordance with the invention, all of the digits of each binary number have to be deciphered, because the polarity of the signal can be determined only after the deciphering of all of the binary digits.

The differences between the coding system according to the invention and the conventional coding system will be explained with reference to the following simple example for an eight step pulse code modulation indicated in the following chart:

| Amplitude Steps | Conventional Coding | Coding according to the invention |
|---|---|---|
| 7 | 111 | 010 |
| 6 | 110 | 111 |
| 5 | 101 | 100 |
| 4 | 100 | 001 |
| 3 | 011 | 011 |
| 2 | 010 | 101 |
| 1 | 001 | 000 |
| 0 | 000 | 110 |

In the above chart, the eight amplitude steps from zero to seven are given in the first column, while the second column indicates the conventional primary coding, as for example obtained by using a modulating tube according to the article, "Electron Beam Deflection Tube for Pulse Code Modulation" by R. W. Sears, in the Bell System Technical Journal, vol. 27, 1948, pages 44–57, or by employing an electronic system as disclosed in U.S. Patent No. 2,272,070 to A. H. Reeves. It can be recognized from the above chart that only the first binary digit discloses whether the amplitude step belongs to the upper or lower half of the amplitude value.

The third column of the chart is an example of a code according to the present invention, wherein all of the binary numbers with an odd number of zeros are assigned to the lower half of the amplitude value, and the binary numbers with an even number of zeros are assigned to the upper half of the amplitude value.

Still further objects and the entire scope of applicability of the present invention will become apparent from the detailed description given hereinafter; it should be understood, however, that the detailed description and specific example, while indicating the preferred embodiment of the invention, are given by way of illustration only, since various changes and modifications within the spirit and scope of the invention will become apparent to those skilled in the art from this detailed description.

The drawing shows a plan view of a perforated target plate for use in a modulating tube according to Sears to perform a conversion of signals into a code according to the present invention.

A cathode beam scans in a known manner over this perforated plate, whereby said cathode beam is deflected in the $y$-direction in accordance with the amplitude to be instantaneously represented and is periodically deflected in the $x$-direction across the perforated plate by a saw-tooth shaped sweep voltage. A collector electrode is provided behind the plate on which the binary numbers representing the coding appear in the form of combinations of three pulses. It can be seen that, in case of the arrangement of apertures shown in the drawing, only the pulse combinations given in column 3 of the chart for the individual amplitude steps will be generated, whereby a one (1) always corresponds to the occurrence of a pulse, while a zero (0) corresponds to the absence of a pulse.

It has been known to obtain $n$ digit binary numbers where $$\binom{n}{0}=1$$

with only binary zeros $$\binom{n}{1}$$

with one binary one $$\binom{n}{2}$$

with two binary ones, and generally $$\binom{n}{k}$$

with $k$ binary ones and $n-k$ binary zeros. These values correspond to the $n$ line of the known number triangle of Pascal. This line reads as follows:

$$\binom{n}{0};\binom{n}{1};\binom{n}{2};\ldots\binom{n}{k-1}$$

$$\binom{n}{k};\binom{n}{k+1};\ldots\binom{n}{n-1};\binom{n}{n}$$

In order to take care of only the physical distribution to the upper and lower halves of the assignment scheme, each second number should be cancelled. The remaining numbers represent a series of binary numbers $$\binom{n}{k}$$

each of which has $k$ binary ones. These ones have to be placed in the upper half of the assignment scheme, while the previously cancelled binary numbers are placed in the lower half. With the exception of the interchange of the upper and lower half, or each $(2^{n-1})!$, permutations of the binary numbers in each of the two halves, the scheme of the desired assignment is clear. In each half column of the chart, there is found the same number of binary zeros and ones and the change of any bit results in a shift from a binary number in one half to a binary number in the other half of the chart.

We claim:

1. A method for converting information contained in a continuous function the polarity of which varies about a mean axis into discontinuous pulse groups, said method comprising the steps of periodically sampling the amplitude of the continuous function and expressing each amplitude in terms of one of $2^n$ discrete steps, separating said steps about said axis according to polarity such that one half of the steps represent one polarity and the other half of said steps represent the other polarity, and converting each step representing an amplitude of said continuous function into a binary number having $n$ digits, said binary numbers being assigned to the opposite sides of said axis such that numbers representing the steps of one polarity contain an odd number of binary zeros and the binary numbers representing the steps of the other polarity contain an even number of zeros.

2. A perforated target plate for an electron beam deflection tube for pulse code modulation, said plate having a plurality of rows disposed parallel to a center line on each side thereof and said rows having apertures therethrough arranged with an odd number of apertures in each row on one side of the center line and an even number of apertures in each row on the other side, whereby the pulse code generated thereby contains an even number of pulses for each of the values on one side of the center line and an odd number of pulses for each of the values on the other side of the center line.

References Cited in the file of this patent

UNITED STATES PATENTS

| | | |
|---|---|---|
| 2,463,535 | Hecht | Mar. 8, 1949 |
| 2,543,116 | Llewellyn | Feb. 27, 1951 |